United States Patent [19]
Kato

[11] Patent Number: 4,478,496
[45] Date of Patent: Oct. 23, 1984

[54] ZOOM LENS

[75] Inventor: Masatake Kato, Tokyo, Japan

[73] Assignee: Canon Kabushiki Kaisha, Tokyo, Japan

[21] Appl. No.: 364,185

[22] Filed: Mar. 31, 1982

[30] Foreign Application Priority Data

Apr. 17, 1981 [JP] Japan ................................. 56-58805

[51] Int. Cl.³ .............................................. G02B 15/14
[52] U.S. Cl. ..................... 350/427; 350/423; 350/428
[58] Field of Search ........................ 350/423, 427, 428

[56] References Cited

U.S. PATENT DOCUMENTS 4,348,082 9/1982 Ogawa ................................. 350/423

Primary Examiner—John K. Corbin
Assistant Examiner—Rebecca D. Gass
Attorney, Agent, or Firm—Toren, McGeady and Stanger

[57] ABSTRACT

A zoom lens having, from front to rear, a 1st lens group of positive refractive power, a 2nd lens group of negative refractive power and a 3rd lens group of positive refractive power. The aforesaid 1st and 2nd lens groups being axially movable in opposite directions to each other to effect zooming, wherein the focal lengths, principal point intervals and lens forms of the aforesaid three lens groups, and the loci of movement of the 1st and 2nd lens groups are so properly determined that good correction of aberrations is achieved.

2 Claims, 60 Drawing Figures

SPHERICAL ABERRATION
SINE CONDITION

FIG.12a2

ASTIGMATISM

FIG.12a3

DISTORTION(%)

FIG.12b1

SPHERICAL ABERRATION
SINE CONDITION

FIG.12b2

ASTIGMATISM

FIG.12b3

DISTORTION(%)

FIG.12c1

SPHERICAL ABERRATION
SINE CONDITION

FIG.12c2

ASTIGMATISM

FIG.12c3

DISTORTION(%)

ZOOM LENS

BACKGROUND OF THE INVENTION

1. Field of the Invention

This invention relates to zoom lenses, and, more particularly, to zoom lenses suited for a range including long focal lengths.

2. Description of the Prior Art

In the past, as one type of zoom lens there has been well known the objective lens system comprising, from front to rear, a varifocal section consisting of three lens groups having positive, negative and positive refractive powers distributed in this order and a fixed section. The 2nd lens group is axially moved to effect a change in the focal length. The 3rd lens group is axially moved in a reciprocating manner to compensate for the image shift due to the zooming. In this type of zoom objective lens, the 1st lens group for focusing remains stationary during zooming. This gives the advantage that the distance from the front vertex of the lens to the image plane, or the total length of the lens does not change between the wide angle and telephoto settings. However, a disadvantage of this type zoom objective is that an increase in the zoom ratio and relative aperture generally calls for rapid increases in the total length of the lens and the diameter of the front lens members, thereby contributing to an extreme loss in compactness. For this reason, most of the known zoom objectives of the type described, as, for example, disclosed in Japanese Patent Sho No. 49-899, Japanese Laid Open Patent Nos. Sho 51-37247 and 51-63635, and U.S. Pat. Nos. 4,223,981 and 4,240,699 have the ratio of the total length of the lens in the telephoto side to the focal length, that is, the telephoto ratio at about unity and even in the shortest case, on the order of 0.97. Accordingly, since determination of the total length of the lens is made by taking into account the possibility of achieving good correction of aberrations at the telephoto settings, because the total length of the lens remain unchanged during zooming, The result is that, at the wide angle settings, the lens is considerably bulky as compared with fixed focal length lenses having the equivalent focal length. Thus, this constitutes a large burden when seeking a place where the lens with the camera body is to be stored, or when the lens is being carried about.

Attempts have been made, therefore, to eliminate the above-described drawbacks and at the same time to achieve a high grade imagery with a reduced number of lens constituents by choosing such zoom type that the total length of the lens expands in the telephoto positions and by having a good compromise between the requirements of giving an appropriate power distribution and employing cam slots of moderate curvature controlling the movement of the lens groups. As examples of zoom objectives of the character described, mention may be made of U.S. Pat. No. 3,784,283 and Japanese Laid Open Patent No. Sho 55-161207, where the varifocal section is formed with a 1st lens group of positive power and a 2nd lens group of negative power, and where the 2nd lens group is moved axially in one direction during the entire zooming range to vary the focal length, while simultaneously the 1st lens group being axially moved reciprocatingly to effect image shift compensation. Since, in this method, however, the 1st lens group which has a relatively large outer diameter and a heavy weight is moved along a tortuous camming slot, a strong stress is laid on the operating mechanism in the lens mounting, and the tolerances within which the parts of the mechanism may be manufactured economically are unavoidably deteriorated badly. Thus, it has found its use mainly in lenses for 8 mm film.

SUMMARY OF THE INVENTION

It is an object of the invention to provide a zoom objective lens with a 1st lens group I of positive refractive power, a 2nd lens group II of negative refractive power and a third lens group III of positive refractive power being arranged in this order from the front, wherein the 1st lens group I is moved axially back and forth in rectilinear manner, and at the same time the 2nd lens group II is moved in the opposite direction in curvilinear manner convex towards the front so that the focal length of the entire lens system is varied while maintaining a constant image plane, and, further, an appropriate power distribution is chosen, whereby as the 2nd lens group of reduced weight and size is moved curvilinearly, the stress on the lens mounting is lessened and a good stability of aberration correction during zooming is achieved.

BRIEF DESCRIPTION OF THE DRAWINGS

FIGS. 7-*a*-1 to 3, to FIGS. 7-*c*-1 to 3 are graphic representations of the aberrations of the lens of FIG. 1.

FIGS. 8-*a*-1 to 3, to FIGS. 8-*c*-1 to 3 are graphic representations of the aberrations of the lens of FIG. 2.

FIGS. 9-*a*-1 to 3, to FIGS. 9-*c*-1 to 3 are graphic representations of the aberrations of the lens of FIG. 3.

FIGS. 10-*a*-1 to 3, to FIGS. 10-*c*-1 to 3 are graphic representations of the aberrations of the lens of FIG. 4.

FIGS. 11-*a*-1 to 3, to FIGS. 11-*a*-1 to 3 are graphic representations of the aberrations of the lens of FIG. 5.

FIGS. 12-*a*-1 to 3, to FIGS. 12-*c*-1 to 3 are graphic representations of the aberrations of the lens of FIG. 6.

DETAILED DESCRIPTION OF THE PREFERRED EMBODIMENTS

The 1st lens group I has a focal length $f_I$ and the 2nd lens group II has a focal length $f_{II}$ with the principal planes of the 1st and 2nd lens groups I and II in an interval $e_{12}'$ on the wide angle side. Letting $\xi$ and $\eta$ denote the amounts of movement of the 1st and 2nd lens groups I and II from the wide angle positions as a start point respectively and giving them the positive sign when they are measured from front to rear on the optical axis, we here define $P=(e_{12}'-f_I-f_{II})+Q$, and $Q=-(f_{II})^2/(e_{12}'-f_I-f_{II})$. Then, if $\xi$ is changed monotonously rectilinearly, the ratio of the amount of movement $\eta$ to that of movement $\xi$ may be expressed by:

$$d\eta/d\xi=(\eta+Q)/(2\eta-\xi+P)$$

It is understandable from this equation that in terms of the axial distances between the wide angle and telephoto positions occupied by the 1st and 2nd lens groups I and II as represented by $\xi_T$ and $\eta_T$ respectively, the smaller the value of $|d\eta/d\xi|$ obtained by substituting $\xi_T$ and $\eta_T$ for $d\xi$ and $d\eta$ respectively, the easier the technique of making the required camming slots becomes. In other words, since the 1st lens group I and the 2nd lens group II axially move in opposite directions to each other when zooming, the more the axial movement $\eta$ in relation to the axial movement $\xi$, the larger the difference between the works is, so that they cannot move smoothly.

In respect to the aim of minimizing the value $\eta_T/\xi_T$, the larger the focal length $f_I$ of the 1st lens group I and the smaller the focal length $f_{II}$ of the 2nd lens group II and, further, the smaller the interval $e_{12}'$ between the principal planes of the 1st and 2nd lens groups I and II, the more advantageously it can be achieved.

In conclusion from the relevant considerations, it is desirable that the value of the factor which can be preferably realized based on experience lies in the following range:

$$0.4 < -d\eta/d\xi < 5 \qquad (1)$$

When the upper limit of condition (1) is exceeded, the movement ratio of $\eta$ and $\xi$ becomes so large that the 2nd lens group II cannot move smoothly. On the other hand, when the lower limit is exceeded, it has, despite the production of an advantage on the control of the lens groups I and II, to increase the $f_I$ and decrease the $|f_{II}|$ with increase in the back focus. This is undesirable. It should be pointed out that the 1st lens groups I is not always rectilinearly moved, and may be moved curvilinearly provided that the condition (1) is satisfied.

Figure 1:
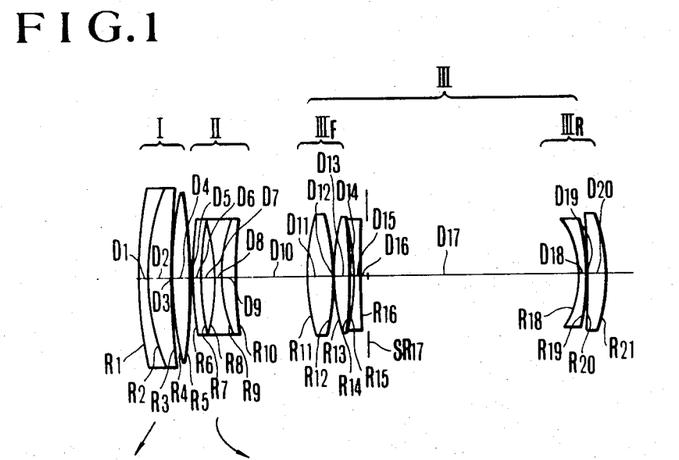
FIGS. 1 to 6 are lens block diagrams of embodiments 1 to 6 of zoom lenses according to the present invention respectively.
Figure 2:
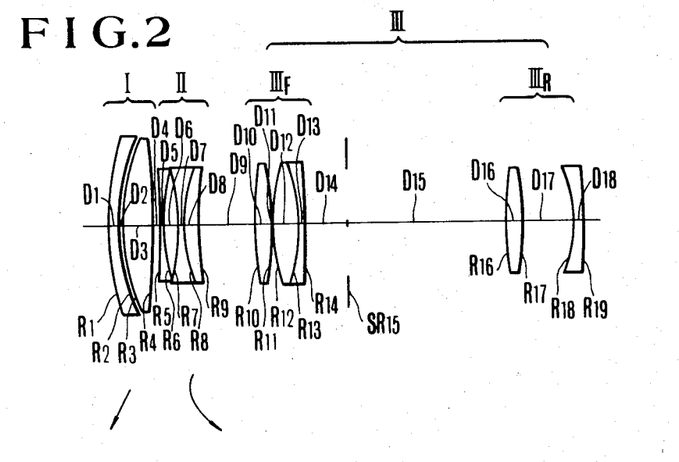
Figure 3:
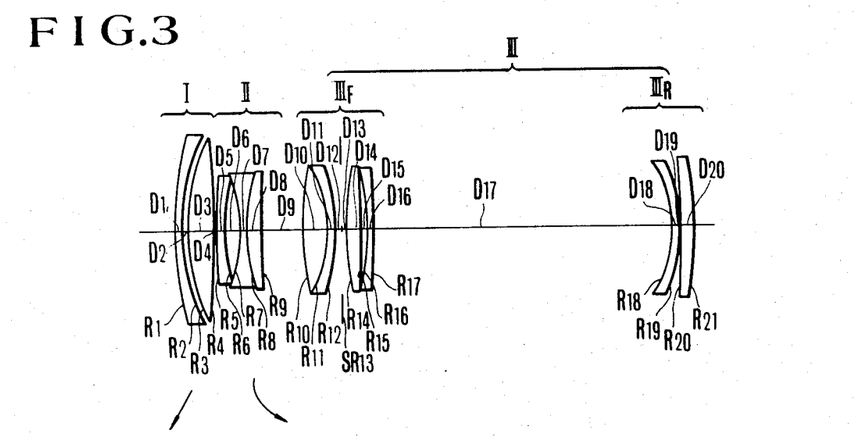
Figure 4:
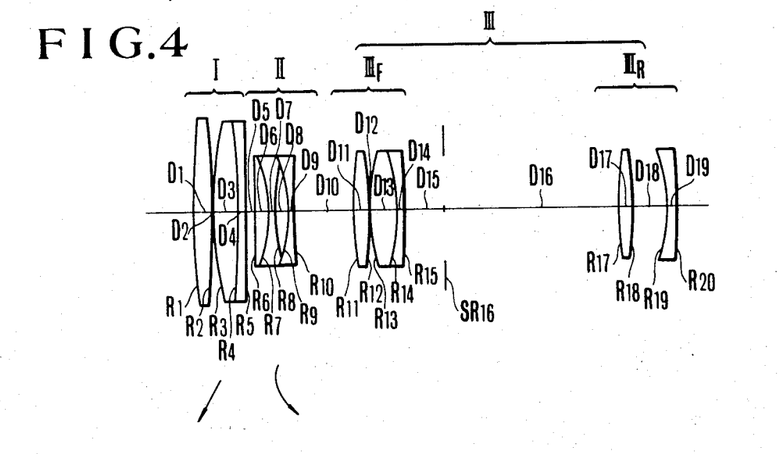
Figure 5:
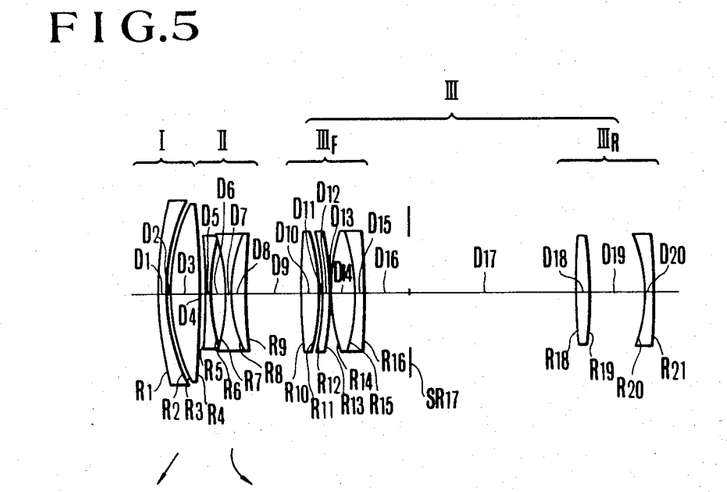

FIGS. 1 to 5 depict practical embodiments of zoom lenses according to the present invention each comprising, from front to rear, the 1st lens group I in the form of a positive lens group for focusing and for maintaining a constant image plane having a negative lens and at least one positive lens, the 2nd lens group II in the form of a negative lens group for image magnification variation or variation of the focal length, and the 3rd lens group III in the form of a positive lens group for forming an image. This third lens group III has a front assembly $III_F$ and a rear assembly $III_R$, the front assembly $III_F$ having two positive lenses and at least one negative lens, and the rear assembly $III_R$ having a positive lens and a negative lens. Letting $f_W$ denote the shortest focal length of the entire lens system, $L_W$ the physical length of the entire lens system, $f_{III}$ the focal length of the 3rd lens group III, $f_{IIIF}$ the focal length of the front assembly $III_F$ in the 3rd lens group III, $N_{3P}$ the refractive index of the rearmost positive lens in the front assembly $III_F$, $N_{3N}$ the refractive index of the rearmost negative lens in the same group, and L3 the length of the fixed 3rd lens group III, it is preferred that the following conditions be satisfied:

$$-1.2 < (e_{12}' - f_I - f_{II})/f_W < -0.7 \qquad (2)$$

$$0.8 < f_{IIIF}/f_{III} < 1.3 \qquad (3)$$

$$0.63 < L3/L_W < 0.74 \qquad (4)$$

$$N_{3P} < N_{3N} \qquad (5)$$

Of these conditions, condition (2) is for realizing a mode of movement in view of the prerequisite that the 2nd lens group II be moved along a camming slot of gentle slope, and conditions (3) and (4) are to compensate for the deterioration of aberrations produced when the power distribution over the 3rd lens group III which remains stationary during zooming, thus contributing to a good stability of aberration correction of the entire system.

The upper limit of condition (2) represents a minimum ratio of the total movements of the 1st lens group I and the 2nd lens group II which permits gentle slop of the camming slot for the 2nd lens group to assure smooth zooming operation. When the upper limit is exceeded, though it is advantageous at aberration correction, the telephoto ratio is objectionably increased with increase in the total optical length. On the other hand, when the lower limit is exceeded, the Petzval sum increases to the negative direction, over-correction of field curvature results, astigmatism also increases and at the same time zonal spherical aberration, too, increases.

Condition (4) is to shorten the total length of the lens within the framework of condition (3). Since, in the embodiments, the lens takes a longer total length when in telephoto settings, the ratio of the length of the 3rd lens group III to the total length of the lens in the wide angle setting is large as compared with the ordinary zoom lenses. When the upper limit is exceeded, the total length of the lens is elongated to involve an increase in the diameter of the front lens members. When the lower limit is exceeded, the Petzval sum increases in the negative sense and the distortion also is increased in the positive sense, or is of prominent pincushion type.

Condition (5) defines a relationship between the refractive indices of the glasses of the rearmost positive and rearmost negative lenses constituting part of the fixed front assembly $III_F$ of the 3rd lens group III. The negative lens in the fixed front assembly $III_F$ is made to have a higher refractive index than the positive lens has so that the Petzval sum is prevented from increasing to the negative direction, thus performing good correction of field curvature.

Figure 6:
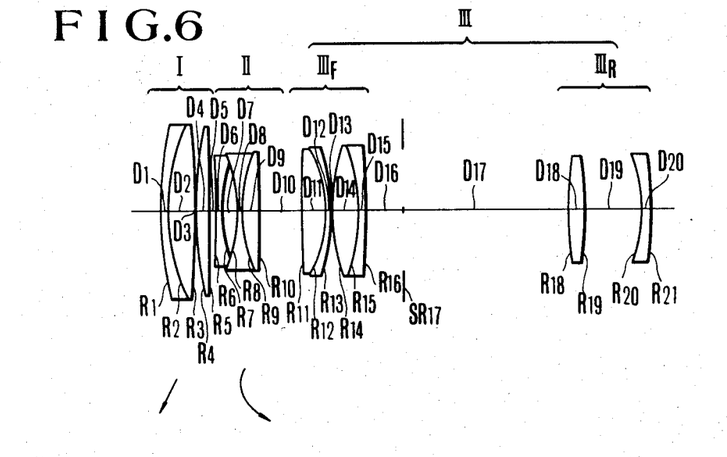
Figure 7A:
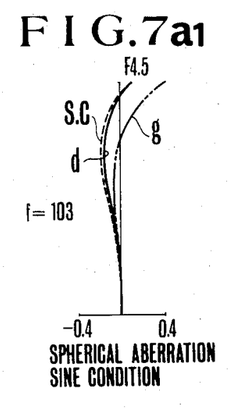
Figure 7A:
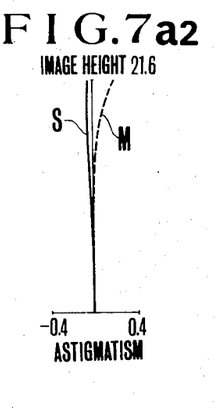
Figure 7A:
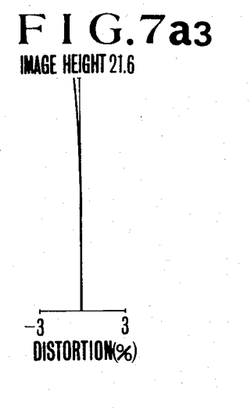
Figure 7B:
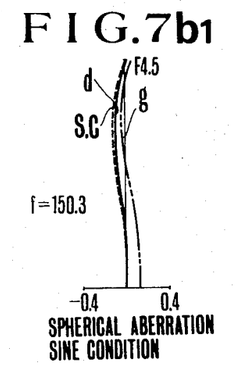
Figure 7B:
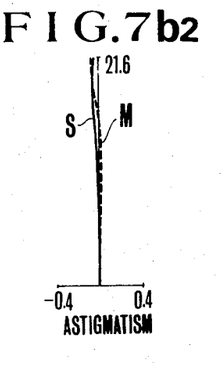
Figure 7B:
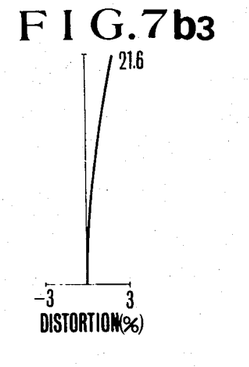
Figure 7C:
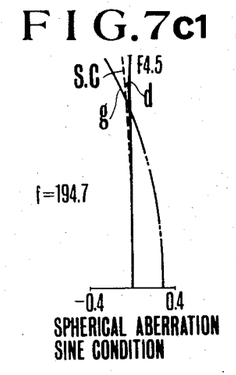
Figure 7C:
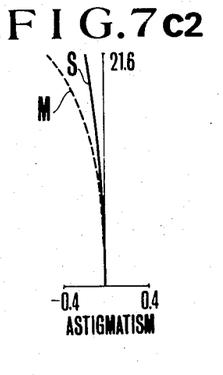
Figure 7C:
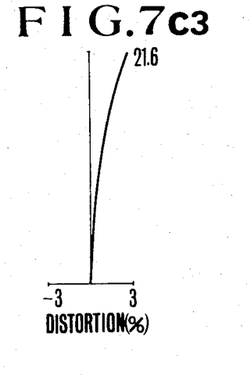
Figure 8A:
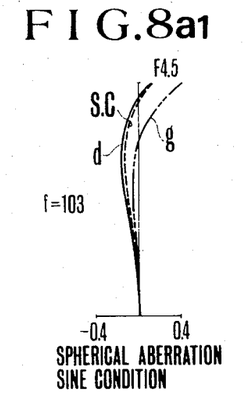
Figure 8A:
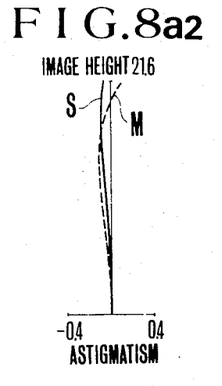
Figure 8A:
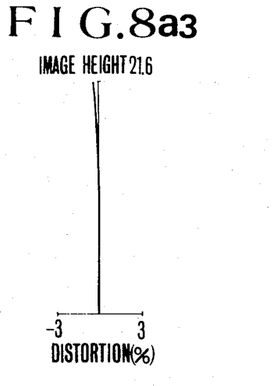
Figure 8B:
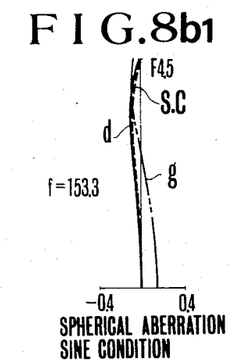
Figure 8B:
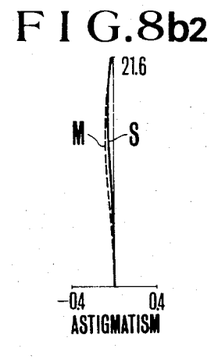
Figure 8B:
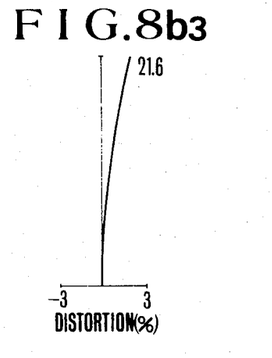
Figure 8C:
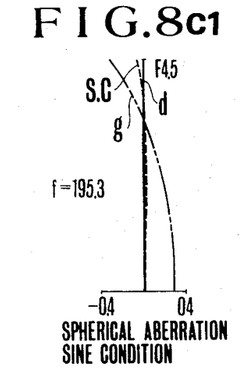
Figure 8C:
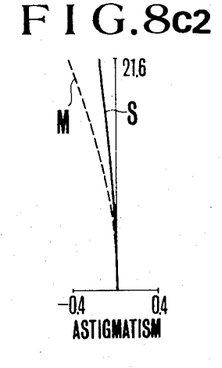
Figure 8C:
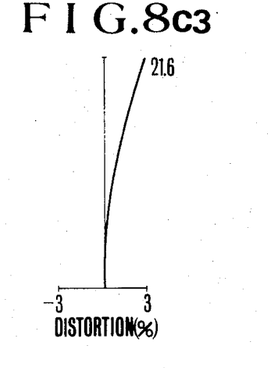
Figure 9A:
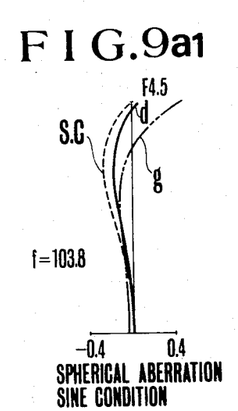
Figure 9A:
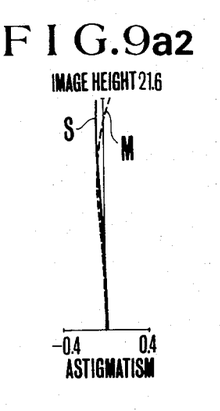
Figure 9A:
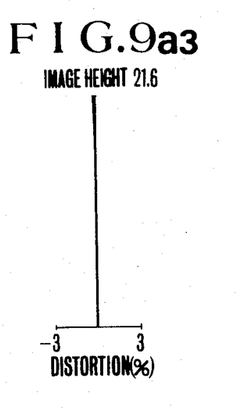
Figure 9B:
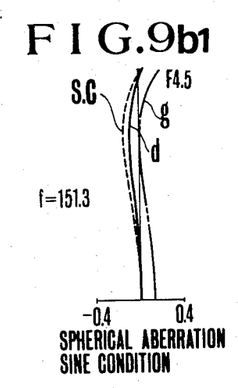
Figure 9B:
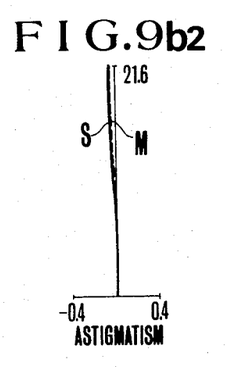
Figure 9B:
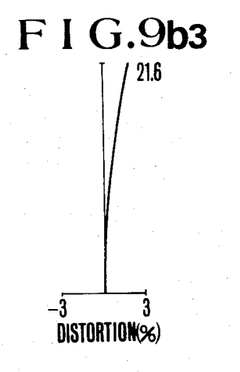
Figure 9C:
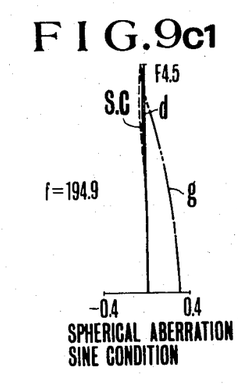
Figure 9C:
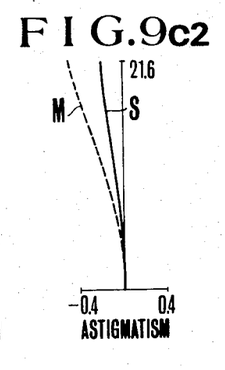
Figure 9C:
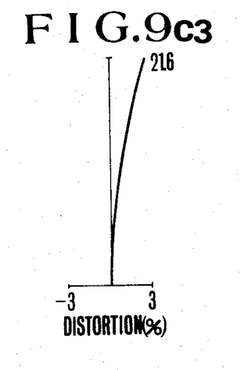
Figure 10A:
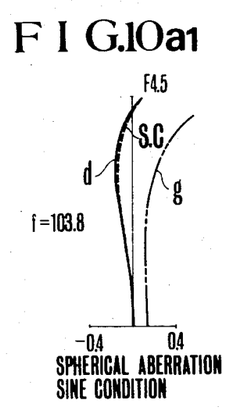
Figure 10A:
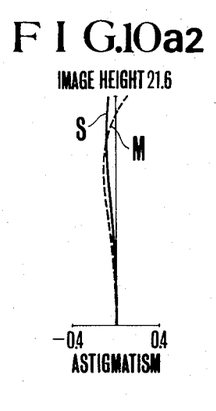
Figure 10A:
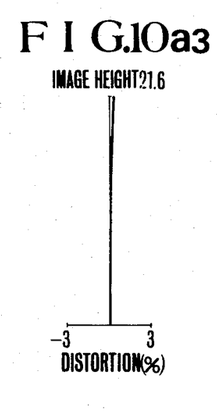
Figure 10B:
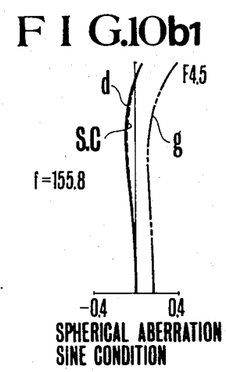
Figure 10B:
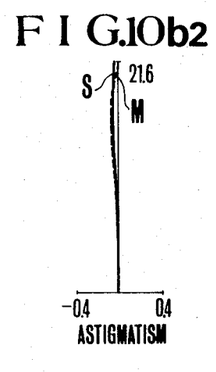
Figure 10B:
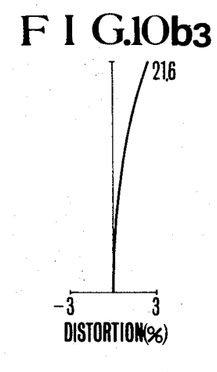
Figure 10C:
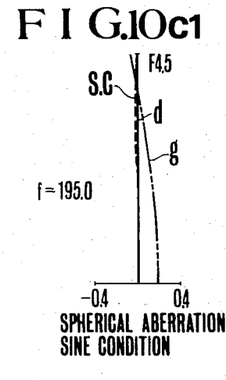
Figure 10C:
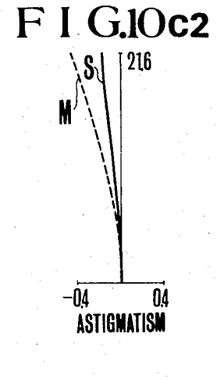
Figure 10C:
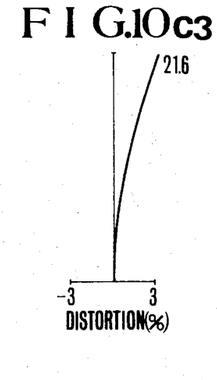
Figure 11A:
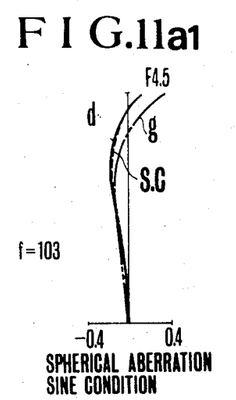
Figure 11A:
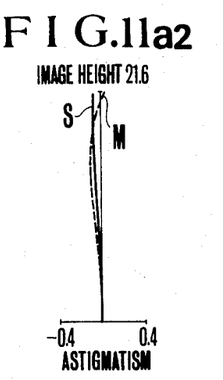
Figure 11A:
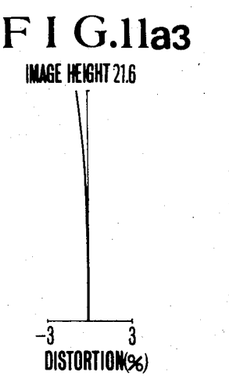
Figure 11B:
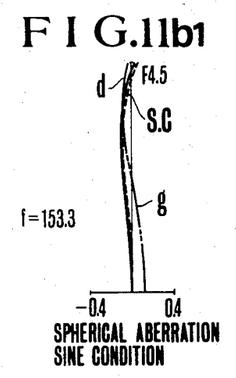
Figure 11B:
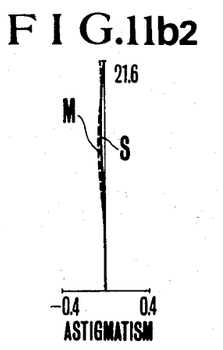
Figure 11B:
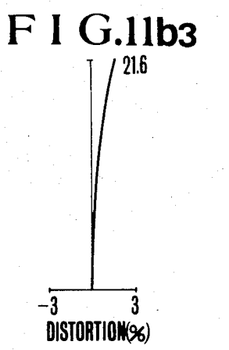
Figure 11C:
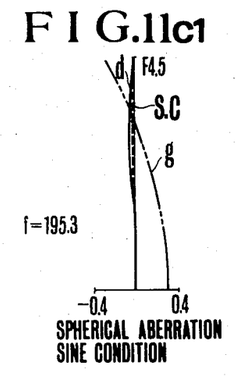
Figure 11C:
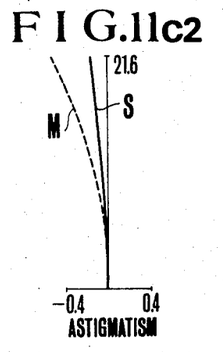
Figure 11C:
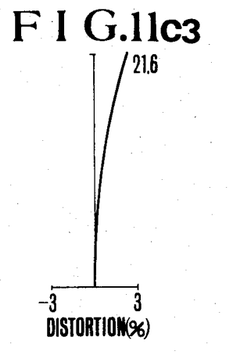
Figure 12A:
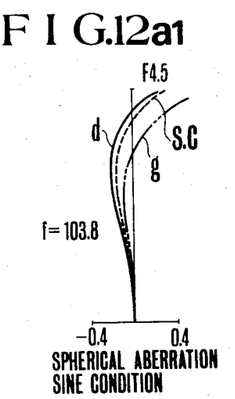
Figure 12A:
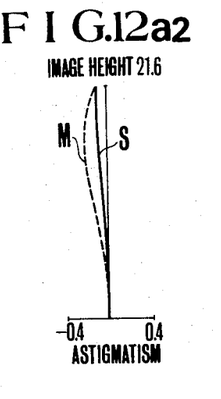
Figure 12A:
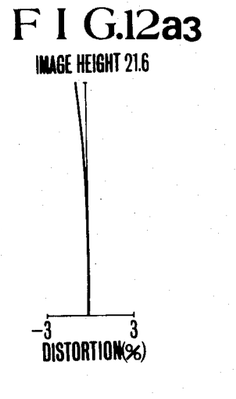
Figure 12B:
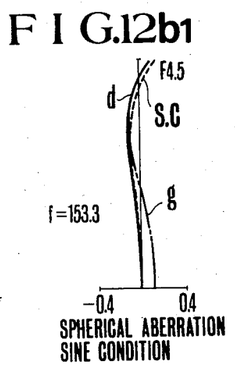
Figure 12B:
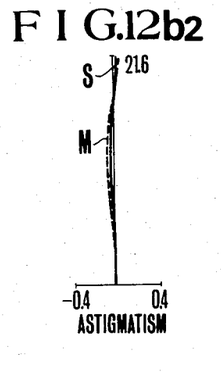
Figure 12B:
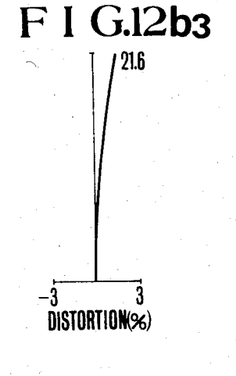
Figure 12C:
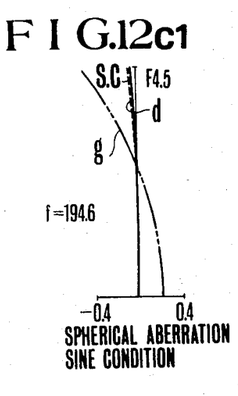
Figure 12C:
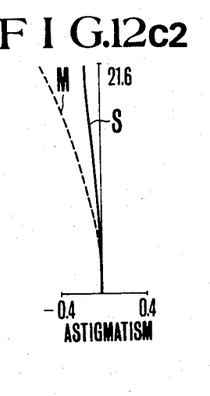
Figure 12C:
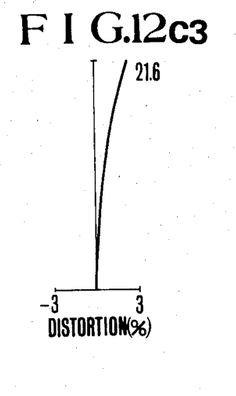

Six examples of specific zoom objective lenses which satisfy the above conditions and are illustrated in FIGS. 1 to 6 respectively can be constructed in accordance with the numerical data given in the following tables for the radii of curvature, R, with a stop at SR, the axial thicknesses and separations, D, and the refractive indices Ni and the Abbe numbers, $\nu$, for the spectral d-line of the glasses from which the lens elements are made up, all expressed with the subscripts numbered consecutively from front to rear in correspondence with those in the drawings.

EXAMPLE 1

|   |   | F = 103–194.7 | FNo. = 1:4.5 | 2ω = 24–12 |   |   |
|---|---|---|---|---|---|---|
|   | R1 = 140.59 | D1 = 2.10 | N1 = 1.80518 | ν1 = 25.4 |
|   | R2 = 56.29 | D2 = 6.50 | N2 = 1.62606 | ν2 = 39.2 |
| I | R3 = 393.07 | D3 = 0.15 |  |  |
|   | R4 = 107.10 | D4 = 4.00 | N3 = 1.51633 | ν3 = 64.1 |
|   | R5 = −299.45 | D5 = Variable |  |  |
|   | R6 = 238.52 | D6 = 1.80 | N4 = 1.60311 | ν4 = 60.7 |
|   | R7 = 52.34 | D7 = 3.80 |  |  |
| II | R8 = −54.99 | D8 = 1.80 | N5 = 1.69680 | ν5 = 55.5 |
|   | R9 = 35.61 | D9 = 4.00 | N6 = 1.80518 | ν6 = 25.4 |
|   | R10 = 153.44 | D10 = Variable |  |  |

-continued

| | | F = 103–194.7 | | FNo. = 1:4.5 | | 2ω = 24–12 | | |
|---|---|---|---|---|---|---|---|---|
| IIIF | { | R11 = | 51.17 | D11 = | 7.00 | N7 = 1.56873 | ν7 = | 63.1 |
| | | R12 = | −56.24 | D12 = | 0.15 | | | |
| | | R13 = | 56.10 | D13 = | 4.00 | N8 = 1.69680 | ν8 = | 55.5 |
| | | R14 = | −2639.45 | D14 = | 1.30 | | | |
| | | R15 = | −66.71 | D15 = | 1.80 | N9 = 1.84666 | ν9 = | 23.9 |
| | | R16 = | 527.59 | D16 = | 2.00 | | | |
| | | SR17 = | 0.0 | D17 = | 57.90 | | | |
| | | R18 = | −22.68 | D18 = | 1.60 | N10 = 1.57135 | ν10 = | 53.0 |
| IIIR | { | R19 = | −68.45 | D19 = | 0.15 | | | |
| | | R20 = | −339.24 | D20 = | 4.98 | N11 = 1.74400 | ν11 = | 44.7 |
| | | R21 = | −46.87 | | | | | |

| F | 103 | 150.3 | 194.7 |
|---|---|---|---|
| D5 | 1.51 | 28.03 | 41.22 |
| D10 | 19.37 | 10.35 | 1.87 |

$(e_{12}' - f_I - f_{II})/f_W = -0.81$
$f_{IIIF}/f_{III} = 0.98$
$L_3/L_W = 0.64$
$N_{3P} = N8 < N_{3N} = N9$
$-d\eta/d\xi = 4.99$

EXAMPLE 2

| | | F = 103–195.3 | | FNo. = 1:4.5 | | 2ω = 24–12 | | |
|---|---|---|---|---|---|---|---|---|
| | { | R1 = | 90.61 | D1 = | 2.20 | N1 = 1.80518 | ν1 = | 25.4 |
| | | R2 = | 53.77 | D2 = | 1.30 | | | |
| I | | R3 = | 56.01 | D3 = | 7.50 | N2 = 1.61765 | ν2 = | 55.0 |
| | | R4 = | −297.06 | D4 = | Variable | | | |
| | | R5 = | −3005.24 | D5 = | 1.60 | N3 = 1.56873 | ν3 = | 63.1 |
| | { | R6 = | 58.38 | D6 = | 3.37 | | | |
| | | R7 = | −53.26 | D7 = | 1.60 | N4 = 1.69680 | ν4 = | 55.5 |
| II | | R8 = | 35.10 | D8 = | 3.70 | N5 = 1.84666 | ν5 = | 23.9 |
| | | R9 = | 114.59 | D9 = | Variable | | | |
| | | R10 = | 143.85 | D10 = | 4.70 | N6 = 1.60311 | ν6 = | 60.7 |
| | | R11 = | −67.73 | D11 = | 0.15 | | | |
| IIIF | { | R12 = | 54.42 | D12 = | 6.70 | N7 = 1.56883 | ν7 = | 56.3 |
| | | R13 = | −47.86 | D13 = | 1.80 | N8 = 1.84666 | ν8 = | 23.9 |
| | | R14 = | −292.17 | D14 = | 11.50 | | | |
| | | SR15 = | 0.0 | D15 = | 42.98 | | | |
| | | R16 = | 108.23 | D16 = | 3.80 | N9 = 1.57135 | ν9 = | 53.0 |
| | | R17 = | −113.02 | D17 = | 14.15 | | | |
| IIIR | { | R18 = | −36.31 | D18 = | 2.50 | N10 = 1.60311 | ν10 = | 60.7 |
| | | R19 = | −216.81 | | | | | |

| F | 103 | 153.3 | 195.3 |
|---|---|---|---|
| D4 | 1.84 | 32.89 | 46.59 |
| D9 | 15.22 | 8.17 | 2.01 |

$(e_{12}' - f_I - f_{II})/f_W = -0.92$
$f_{IIIF}/f_{III} = -1.23$
$L_3/L_W = -0.68$
$N_{3P} = N7 < N_{3N} = N8$
$-d\eta/d\xi = 1.20$

EXAMPLE 3

| | | F = 103.8–194.9 | | FNo. = 1:4.5 | | 2ω = 24–12 | | |
|---|---|---|---|---|---|---|---|---|
| | { | R1 = | 95.99 | D1 = | 2.20 | N1 = 1.80518 | ν1 = | 25.4 |
| | | R2 = | 60.61 | D2 = | 1.30 | | | |
| I | | R3 = | 63.52 | D3 = | 6.50 | N2 = 1.61375 | ν2 = | 56.4 |
| | | R4 = | −397.46 | D4 = | Variable | | | |
| | | R5 = | 197.04 | D5 = | 1.80 | N3 = 1.69680 | ν3 = | 55.5 |
| | { | R6 = | 42.49 | D6 = | 4.24 | | | |
| | | R7 = | −39.35 | D7 = | 1.80 | N4 = 1.71300 | ν4 = | 53.8 |
| II | | R8 = | 43.50 | D8 = | 4.00 | N5 = 1.84666 | ν5 = | 23.9 |
| | | R9 = | 538.70 | D9 = | Variable | | | |
| | | R10 = | 93.78 | D10 = | 6.50 | N6 = 1.73500 | ν6 = | 49.8 |
| | | R11 = | −32.38 | D11 = | 1.90 | N7 = 1.80518 | ν7 = | 25.4 |
| | | R12 = | −53.89 | D12 = | 1.50 | | | |
| | | SR13 = | 0.0 | D13 = | 1.50 | | | |
| IIIF | { | R14 = | 77.08 | D14 = | 4.00 | N8 = 1.71300 | ν8 = | 53.8 |
| | | R15 = | −449.05 | D15 = | 1.50 | | | |
| | | R16 = | −61.55 | D16 = | 1.80 | N9 = 1.84666 | ν9 = | 23.9 |
| | | R17 = | −180.62 | D17 = | 80.49 | | | |
| | | R18 = | −29.21 | D18 = | 2.00 | N10 = 1.56732 | ν10 = | 42.8 |
| | | R19 = | −37.91 | D19 = | 0.15 | | | |

-continued

| | | F = 103.8–194.9 | | FNo. = 1:4.5 | | $2\omega = 24–12$ | | |
|---|---|---|---|---|---|---|---|---|
| IIIR | { | R20 = −821.63 | D20 = | 3.50 | N11 = | 1.71300 | $\nu 11 =$ | 53.8 |
| | | R21 = −98.29 | | | | | | |

| F | 103.8 | 151.3 | 194.9 |
|---|---|---|---|
| D4 | 1.11 | 37.42 | 55.16 |
| D9 | 11.50 | 7.19 | 3.23 |

$(e_{12}' - f_I - f_{II})/f_W = -1.11$
$f_{IIIF}/f_{III} = 0.84$
$L3/L_W = 0.73$
$N_{3P} = N8 < N_{3N} = N9$
$-d\eta/d\xi = 0.40$

EXAMPLE 4

| | | F = 103.8–195 | | FNo. = 1:4.5 | | $2\omega = 24–12$ | | |
|---|---|---|---|---|---|---|---|---|
| I | { | R1 = 249.74 | D1 = | 5.00 | N1 = | 1.51633 | $\nu 1 =$ | 64.1 |
| | | R2 = −261.21 | D2 = | 0.15 | | | | |
| | | R3 = 140.46 | D3 = | 7.00 | N2 = | 1.61800 | $\nu 2 =$ | 63.4 |
| | | R4 = −190.37 | D4 = | 1.90 | N3 = | 1.80518 | $\nu 3 =$ | 25.4 |
| | | R5 = 2090.85 | D5 = | Variable | | | | |
| II | { | R6 = −489.97 | D6 = | 3.70 | N4 = | 1.84666 | $\nu 4 =$ | 23.9 |
| | | R7 = −37.52 | D7 = | 1.60 | N5 = | 1.69700 | $\nu 5 =$ | 48.5 |
| | | R8 = 58.04 | D8 = | 3.49 | | | | |
| | | R9 = −38.44 | D9 = | 1.60 | N6 = | 1.57957 | $\nu 6 =$ | 53.7 |
| | | R10 = 368.63 | D10 = | Variable | | | | |
| IIIF | { | R11 = 146.61 | D11 = | 4.70 | N7 = | 1.62299 | $\nu 7 =$ | 58.2 |
| | | R12 = −70.42 | D12 = | 0.15 | | | | |
| | | R13 = 57.97 | D13 = | 6.70 | N8 = | 1.58313 | $\nu 8 =$ | 59.4 |
| | | R14 = −46.89 | D14 = | 1.80 | N9 = | 1.84666 | $\nu 9 =$ | 23.9 |
| | | R15 = −255.53 | D15 = | 11.50 | | | | |
| | | SR16 = 0.0 | D16 = | 47.28 | | | | |
| IIIR | { | R17 = 123.33 | D17 = | 3.80 | N10 = | 1.56732 | $\nu 10 =$ | 42.8 |
| | | R18 = −86.31 | D18 = | 9.50 | | | | |
| | | R19 = −37.19 | D19 = | 2.50 | N11 = | 1.60311 | $\nu 11 =$ | 60.7 |
| | | R20 = −214.3 | | | | | | |

| F | 103.8 | 155.8 | 195.0 |
|---|---|---|---|
| D5 | 2.63 | 32.34 | 44.26 |
| D10 | 16.47 | 8.76 | 2.95 |

$(e_{12}' - f_I - f_{II})/f_W = -0.86$
$f_{IIIF}/f_{III} = 1.15$
$L3/L_W = 0.67$
$N_{3P} = N8 < N_{3N} = N9$
$-d\eta/d\xi = 1.56$

EXAMPLE 5

| | | F = 103–195.29 | | FNo. = 1:4.5 | | $2\omega = 24–12$ | | |
|---|---|---|---|---|---|---|---|---|
| I | { | R1 = 87.91 | D1 = | 2.20 | N1 = | 1.80518 | $\nu 1 =$ | 25.4 |
| | | R2 = 54.23 | D2 = | 1.30 | | | | |
| | | R3 = 56.62 | D3 = | 7.50 | N2 = | 1.60738 | $\nu 2 =$ | 56.8 |
| | | R4 = −305.76 | D4 = | Variable | | | | |
| | | R5 = −1042.38 | D5 = | 1.60 | N3 = | 1.54771 | $\nu 3 =$ | 62.9 |
| II | { | R6 = 56.52 | D6 = | 3.63 | | | | |
| | | R7 = −52.77 | D7 = | 1.60 | N4 = | 1.67000 | $\nu 4 =$ | 57.4 |
| | | R8 = 36.20 | D8 = | 3.70 | N5 = | 1.84666 | $\nu 5 =$ | 23.9 |
| | | R9 = 105.44 | D9 = | Variable | | | | |
| | | R10 = 170.73 | D10 = | 5.00 | N6 = | 1.71300 | $\nu 6 =$ | 53.8 |
| | | R11 = −59.07 | D11 = | 0.77 | | | | |
| IIIF | { | R12 = −85.88 | D12 = | 1.90 | N7 = | 1.75520 | $\nu 7 =$ | 27.5 |
| | | R13 = −137.92 | D13 = | 0.15 | | | | |
| | | R14 = 56.10 | D14 = | 6.70 | N8 = | 1.58267 | $\nu 8 =$ | 46.4 |
| | | R15 = −45.28 | D15 = | 1.80 | N9 = | 1.84666 | $\nu 9 =$ | 23.9 |
| | | R16 = −329.48 | D16 = | 12.20 | | | | |
| | | SR17 = 0.0 | D17 = | 44.39 | | | | |
| IIIR | { | R18 = 148.25 | D18 = | 3.80 | N10 = | 1.61117 | $\nu 10 =$ | 55.9 |
| | | R19 = −102.26 | D19 = | 14.64 | | | | |
| | | R20 = −39.12 | D20 = | 2.50 | N11 = | 1.60729 | $\nu 11 =$ | 59.4 |
| | | R21 = −160.99 | | | | | | |

| F | 103 | 153.3 | 195.3 |
|---|---|---|---|
| D4 | 1.47 | 32.53 | 46.23 |
| D9 | 14.87 | 7.81 | 2.26 |

$(e_{12}' - f_I - f_{II})/f_W = -0.92$
$f_{IIIF}/f_{III} = 1.17$
$L3/L_W = 0.69$

-continued

| F = 103–195.29 | FNo. = 1:4.5 | 2ω = 24–12 |
|---|---|---|

$N_{3P} = N8 < N_{3N} = N9$
$-d\eta/d\xi = 1.20$

EXAMPLE 6

| | | F = 103.8–194.6 | | FNo. = 1:4.5 | | 2ω = 24–12 | | |
|---|---|---|---|---|---|---|---|---|
| I | R1 = | 108.23 | D1 = | 2.10 | N1 = 1.80518 | | ν1 | 25.4 |
| | R2 = | 60.41 | D2 = | 7.00 | N2 = 1.60738 | | ν2 = | 56.8 |
| | R3 = | −624.84 | D3 = | 0.15 | | | | |
| | R4 = | 130.14 | D4 = | 3.50 | N3 = 1.51633 | | ν3 = | 64.1 |
| | R5 = | 1632.82 | D5 = | Variable | | | | |
| II | R6 = | −1080.17 | D6 = | 1.80 | N4 = 1.69680 | | ν4 = | 55.5 |
| | R7 = | 43.47 | D7 = | 4.22 | | | | |
| | R8 = | −39.75 | D8 = | 1.80 | N5 = 1.72916 | | ν5 = | 54.7 |
| | R9 = | 42.29 | D9 = | 4.00 | N6 = 1.84666 | | ν6 = | 23.9 |
| | R10 = | 11821.10 | D10 = | Variable | | | | |
| IIIF | R11 = | 402.41 | D11 = | 6.50 | N7 = 1.62012 | | ν7 = | 49.6 |
| | R12 = | −29.99 | D12 = | 1.70 | N8 = 1.80518 | | ν8 = | 25.4 |
| | R13 = | −47.62 | D13 = | 0.15 | | | | |
| | R14 = | 54.33 | D14 = | 6.70 | N9 = 1.60562 | | ν9 = | 43.7 |
| | R15 = | −48.68 | D15 = | 1.80 | N10 = 1.84666 | | ν10 = | 23.9 |
| | R16 = | −258.34 | D16 = | 9.99 | | | | |
| | SR17 = | 0.0 | D17 = | 44.93 | | | | |
| IIIR | R18 = | 112.28 | D18 = | 3.80 | N11 = 1.56883 | | ν11 = | 56.3 |
| | R19 = | −116.32 | D19 = | 15.42 | | | | |
| | R20 = | −37.29 | D20 = | 2.50 | N12 = 1.61272 | | ν12 = | 58.7 |
| | R21 = | −170.79 | | | | | | |

| F | 103.8 | 153.32 | 194.63 |
|---|---|---|---|
| D5 | 1.50 | 25.72 | 36.50 |
| D10 | 11.64 | 5.91 | 1.13 |

$(e_{12}' - f_I - f_{II})/f_W = -0.72$
$f_{IIIF}/f_{III} = 1.22$
$L3/L_W = 0.71$
$N_{3P} = N9 < N_{3N} = N10$
$-d\eta/d\xi = 1.29$

What is claimed is:

1. A zoom lens comprising:
a first lens component having a positive refractive power and being movable when zooming;
a second lens component having a negative refractive power and being movable when zooming, said second lens component lying on the image side of said first lens component;
a third lens component having a positive refractive power and being stationary when zooming, said third lens component lying on the image side of said second lens component;
whereby letting $f_I$ denote the focal length of said first lens component, $f_{II}$ the focal length of said second lens component, $e_{12}$ the interval between the principal points of said first and second lens components in the shortest focal length position, and $\xi$ and $\eta$ said first and second lens components moving from their wide angle positions as the starting point respectively when zooming is performed in the direction from the object side to the image side taken as positive, the ratio of the speed of said second lens component to the speed of said first lens component, or $d\eta/d\xi$ expressed by $$d\eta/d\xi = (\eta + Q)/(2\eta - \xi + P)$$

$$P = (e_{12}' - f_I - f_{II}) + Q$$

$$A = -(f_{II})^2/(e_{12}' - f_I - f_{II}),$$

satisfies the following condition in the telephoto positions of said first and second lens components:

$$0.4 < -d\eta/d\xi < 5.$$

2. A zoom lens according to claim 1, wherein said first lens component has a negative lens and at least one positive lens, said third lens component has two lens assemblies with the front assembly $III_F$ and the rear assembly $III_R$, said front assembly $III_F$ has two positive lenses and at least one negative lens, and said rear assembly $III_R$ has a positive lens and a negative lens; and wherein letting $f_w$ denote the focal length of the zooming position of the wide angle side;
$L_w$ the length of the entire lens system in the zooming position of the wide angle side;
$f_{III}$, L3 the focal length and the lens length of said 3rd lens group;
$f_{IIIF}$ the focal length of said front assembly $III_F$;
$N_{3P}$ the index of refraction of the glass of the positive lens positioned most rearwardly in said front assembly $III_F$; and
$N_{3N}$ the index of refraction of the glass of the negative lens positioned most rearwardly in the same assembly, $$-1.2 < (e_{12}' - f_I - f_{II})/f_W < 0.7$$

$$0.8 < f_{IIIF}/f_{III} < 1.3$$

$$0.63 < L3/L_W < 0.74$$

$$N_{3P} < N_{3N}$$

are satisfied.

* * * * *